(12) United States Patent
Lapstun et al.

(10) Patent No.: US 8,121,782 B2
(45) Date of Patent: *Feb. 21, 2012

(54) SYSTEM FOR PROVIDING INFORMATION THROUGH INTERACTION WITH A PRINTED PAGE

(75) Inventors: Paul Lapstun, Balmain (AU); Jacqueline Anne Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,660

(22) Filed: Mar. 9, 2010

(65) Prior Publication Data
US 2010/0165415 A1    Jul. 1, 2010

Related U.S. Application Data

(63) Continuation of application No. 12/177,145, filed on Jul. 21, 2008, now Pat. No. 7,689,350, which is a continuation of application No. 11/739,014, filed on Apr. 23, 2007, now Pat. No. 7,421,337, which is a continuation of application No. 10/974,730, filed on Oct. 28, 2004, now Pat. No. 7,231,293, which is a continuation of application No. 09/693,280, filed on Oct. 20, 2000, now Pat. No. 6,813,558.

(30) Foreign Application Priority Data

Oct. 25, 1999    (AU) .................................... PQ3632

(51) Int. Cl.
*G06K 9/00*    (2006.01)

(52) U.S. Cl. ..................................... 701/202; 178/18.03
(58) Field of Classification Search .......... 701/200–202, 701/207–209, 211, 213; 345/179, 180, 173, 345/175; 178/18.03, 18.09, 18.01, 19.01; 382/314, 315, 317; 341/13; 235/456
See application file for complete search history.

(56) References Cited

U.S. PATENT DOCUMENTS

| | | | |
|---|---|---|---|
| 4,393,448 | A | 7/1983 | Dunn et al. |
| 4,631,678 | A | 12/1986 | Angermueller et al. |

(Continued)

FOREIGN PATENT DOCUMENTS

CN    1161098 A    10/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner* — Dalena Tran

(57) ABSTRACT

A system for providing information is disclosed. The system has a server which stores page descriptors. A printer is also includes which prints a printed page with visible and invisible data. The invisible data is indicative of one or more of the page descriptors. A sensing device senses the invisible data when placed in an operative position relative to the printed page, and transmits information extracted from sensed invisible data to the server. The server is configured to interpret the positioning of the sensing device based upon the page descriptors indicated by sensed invisible data and to provide information associated with the page descriptors.

7 Claims, 17 Drawing Sheets

U.S. PATENT DOCUMENTS

| | | |
|---|---|---|
| 4,668,858 A | 5/1987 | Heuwieser et al. |
| 4,796,190 A | 1/1989 | Cummings |
| 4,864,618 A | 9/1989 | Wright et al. |
| 4,888,699 A | 12/1989 | Knoll et al. |
| 5,051,736 A | 9/1991 | Bennett et al. |
| 5,184,303 A | 2/1993 | Link |
| 5,268,844 A | 12/1993 | Carver et al. |
| 5,385,371 A | 1/1995 | Izawa |
| 5,406,491 A | 4/1995 | Lima |
| 5,477,012 A | 12/1995 | Sekendur |
| 5,544,052 A | 8/1996 | Fujita et al. |
| 5,586,226 A * | 12/1996 | Kubota ............ 358/1.11 |
| 5,612,720 A | 3/1997 | Ito et al. |
| 5,646,856 A | 7/1997 | Kaesser |
| 5,652,412 A | 7/1997 | Lazzouni et al. |
| 5,661,506 A | 8/1997 | Lazzouni et al. |
| 5,686,705 A | 11/1997 | Conroy et al. |
| 5,692,073 A | 11/1997 | Cass |
| 5,852,434 A | 12/1998 | Sekendur |
| 6,012,102 A | 1/2000 | Shachar |
| 6,076,734 A | 6/2000 | Dougherty et al. |
| 6,175,801 B1 | 1/2001 | Millington |
| 6,177,934 B1 * | 1/2001 | Sugiura et al. ............ 715/748 |
| 6,202,024 B1 | 3/2001 | Yokoyama et al. |
| 6,266,611 B1 | 7/2001 | Matsubayashi |
| 6,304,819 B1 | 10/2001 | Agnew et al. |
| 6,321,158 B1 | 11/2001 | Delorme et al. |
| 6,946,374 B2 | 9/2005 | Park |
| 6,964,374 B1 | 11/2005 | Djuknic et al. |

FOREIGN PATENT DOCUMENTS

| | | |
|---|---|---|
| FR | 2695496 | 3/1994 |
| FR | 2717924 A | 9/1995 |
| GB | 2306669 A | 5/1997 |
| WO | WO 99/18487 A2 | 4/1999 |
| WO | WO 99/19823 A | 4/1999 |
| WO | WO 99/50787 | 10/1999 |
| WO | WO 99/50787 A1 | 10/1999 |

* cited by examiner

ROUTE PLANNER - TRIP DESTINATION       PAGE 1 OF 1

POINT OF ORIGIN    ORIGIN

SPECIFY YOUR TRIP DESTINATION

CLICK ON A NETPAGE MAP
OR                                     LAST SELECTED LOCATION
CLICK ON A 'LOCATION' BUTTON

SPECIFY ANOTHER DESTINATION

DESTINATION                            OTHER LOCATION

522

RESET FORM

FIG. 16

ROUTE PLANNER - PREFERENCES     PAGE 1 OF 1

TRIP ORIGIN        [ ORIGIN ]

TRIP DESTINATION   [ DESTINATION ]

ROUTE PREFERENCES

SELECT YOUR ROUTE PREFERENCES FROM THE LIST BELOW. YOU CAN LEAVE AN OPTION BLANK TO INDICATE NO PREFERENCE.

|  | FAVOR | AVOID |
|---|---|---|
| TOLLWAYS | ☐ | ☐ |
| MOUNTAIN ROADS | ☐ | ☐ |
| SCENIC ROADS | ☐ | ☐ |
| SEASONAL ROADS | ☐ | ☐ |
| INTERSTATE ROAD [NBR] | ☐ | ☐ |

PLAN ROUTE
529

524

RESET FORM

FIG. 17

SYSTEM FOR PROVIDING INFORMATION THROUGH INTERACTION WITH A PRINTED PAGE

CROSS REFERENCE TO RELATED APPLICATIONS

This is a Continuation Application of U.S. Ser. No. 12/177, 145 filed on Jul. 21, 2008 now issued U.S. Pat. No. 7,689,350 which is a Continuation Application of U.S. Ser. No. 11/739, 014 filed on Apr. 23, 2007, now issued U.S. Pat. No. 7,421, 337, which is a Continuation Application of U.S. Ser. No. 10/974,730 filed on Oct. 28, 2004, now issued U.S. Pat. No. 7,231,293, which is a Continuation Application of U.S. Ser. No. 09/693,280 filed on Oct. 20, 2000, now issued U.S. Pat. No. 6,813,558, which is all herein incorporated by reference.

FIELD OF INVENTION

The present invention relates generally to computing systems and, more particularly, to a method and system for enabling route planning.

CO-PENDING APPLICATIONS

Various methods, systems and apparatus relating to the present invention are disclosed in the following co-pending applications/patents filed by the applicant or assignee of the present invention:

| | | | | |
|---|---|---|---|---|
| 7,190,474 | 7,110,126 | 6,813,558 | 6,965,454 | 6,847,883 |
| 7,131,058 | 7,533,031 | 6,982,798 | 6,474,888 | 6,627,870 |
| 7,369,265 | 6,454,482 | 6,808,330 | 6,527,365 | 6,474,773 |
| 6,550,997 | 6,766,942 | 7,286,113 | 6,679,420 | 6,963,845 |
| 6,995,859 | 6,720,985 | 6,973,450 | 7,150,404 | 6,824,044 |
| 6,678,499 | 6,976,220 | 6,976,035 | 6,457,883 | 6,831,682 |
| 6,922,779 | 6,978,019 | 7,406,445 | 6,959,298 | 6,328,431 |
| 6,328,425 | 6,965,882 | 7,233,924 | 7,007,851 | 6,957,921 |
| 7,018,016 | 6,328,417 | 6,977,751 | 6,398,332 | 6,394,573 |
| 6,622,923 | 6,813,039 | 6,987,506 | 6,428,133 | 6,526,658 |
| 6,338,548 | 6,540,319 | 7,350,236 | 6,681,045 | 6,991,320 |
| 6,383,833 | 6,464,332 | 6,390,591 | 7,068,382 | 7,062,651 |
| 09/575,197 | 7,079,712 | 6,825,945 | 7,330,974 | 6,622,999 |
| 6,669,385 | 7,038,797 | 6,980,318 | 6,816,274 | 7,102,772 |
| 6,439,706 | 6,760,119 | 6,728,000 | 7,173,722 | 7,088,459 |
| 09/575,181 | 6,870,966 | 6,822,639 | 6,789,194 | 6,789,191 |
| 6,644,642 | 6,502,614 | 6,832,717 | 6,957,768 | 6,549,935 |
| 6,987,573 | 6,727,996 | 6,591,884 | 6,281,912 | 6,604,810 |
| 7,295,332 | 6,290,349 | 6,428,155 | 6,785,016 | 6,859,289 |
| 7,123,239 | 6,737,591 | 7,055,739 | 7,233,320 | 6,830,196 |
| 7,106,888 | 7,154,638 | 7,456,820 | 7,170,499 | 6,318,920 |
| 6,488,422 | 6,795,215 | | | |

The disclosures of these co-pending applications/patents are incorporated herein by reference.

BACKGROUND

A variety of route planning systems and devices are known. Some are provided on general-purpose computer systems such as personal computers or on the World Wide Web, while others are provided as part of dedicated devices such as automobile navigation systems. The traveler, who is typically a driver, specifies a starting point, a destination and optionally a number of intermediate way-points, and the route planning system automatically plans a suitable route.

A typical automobile navigation system uses GPS to track the location of the car. It may provide automatic route planning, or it may only allow the driver to enter a route planned by other means. In any case the navigation system typically assists the driver in following the route by displaying local mapping data keyed to the car's current location and issuing directions to the driver to follow the route. It may also utilize synthesized spoken instructions.

Route planning systems suffer from a number of problems. Route planning is often not integrated with an automobile navigation system where it is needed, requiring manual and laborious entry of way-points. Where it is integrated, the limited size and resolution of navigation system screens make the entry of locations awkward.

SUMMARY OF INVENTION

According to an aspect of the present invention there is provided a system for providing information, said system comprising:

a server for storing a plurality of page descriptors;

a printer for printing a printed page with visible and invisible data, said invisible data being indicative of one or more of the page descriptors stored in the server; and a sensing device for sensing the invisible data when placed in an operative position relative to the printed page, and transmitting information extracted from sensed invisible data to the server, wherein the server is configured to interpret positioning of the sensing device based upon the page descriptors indicated by sensed invisible data and providing information associated with the page descriptors.

BRIEF DESCRIPTION OF DRAWINGS

Preferred and other embodiments of the invention will now be described, by way of non-limiting example only, with reference to the accompanying drawings, in which:

FIG. 16 illustrates the trip destination page;

FIG. 17 illustrates the preferences page;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. Nos. 09/575,129, 09/575,174, 09/575,155, 09/575,195, and 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
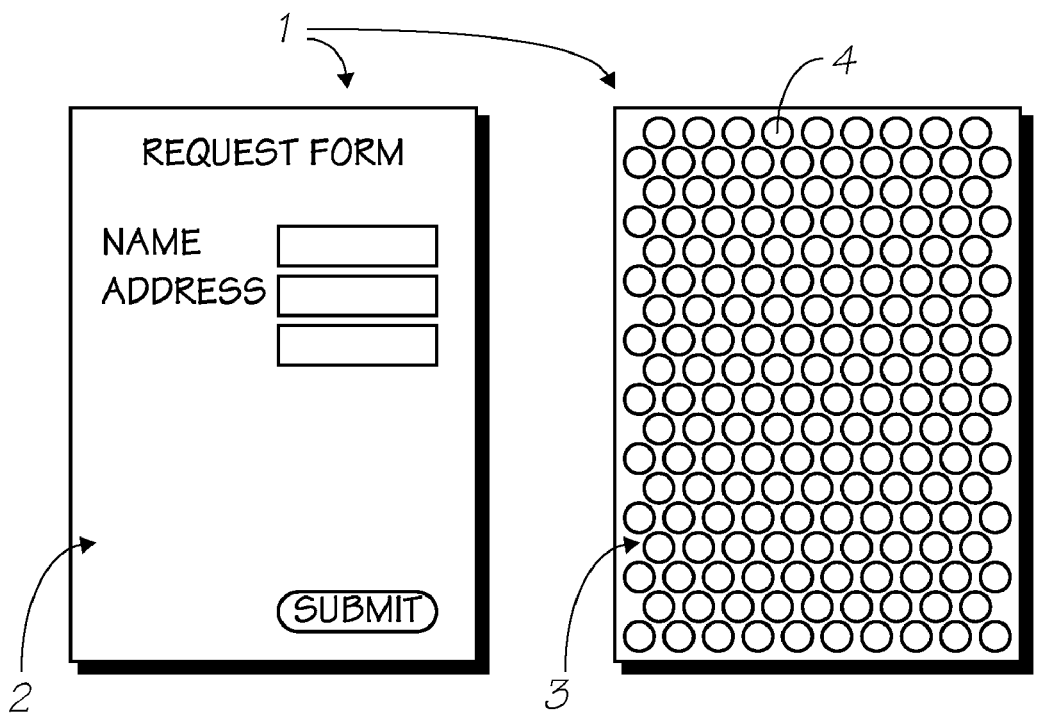
FIG. 1 is a schematic of a the relationship between a sample printed netpage and its online page description.
Figure 1:
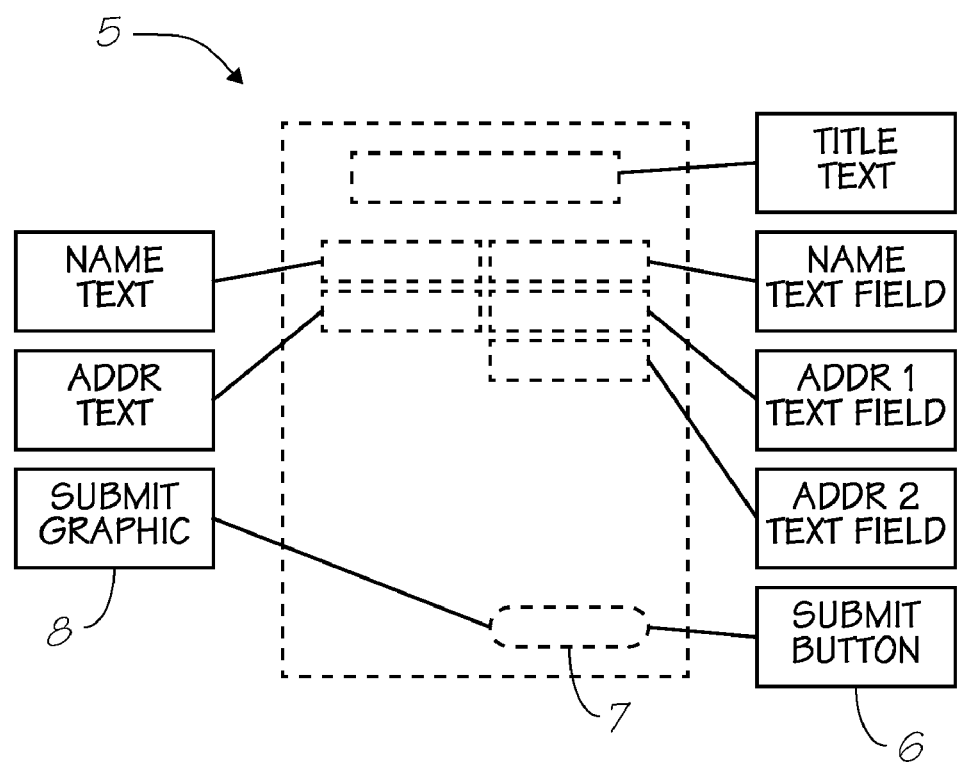

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
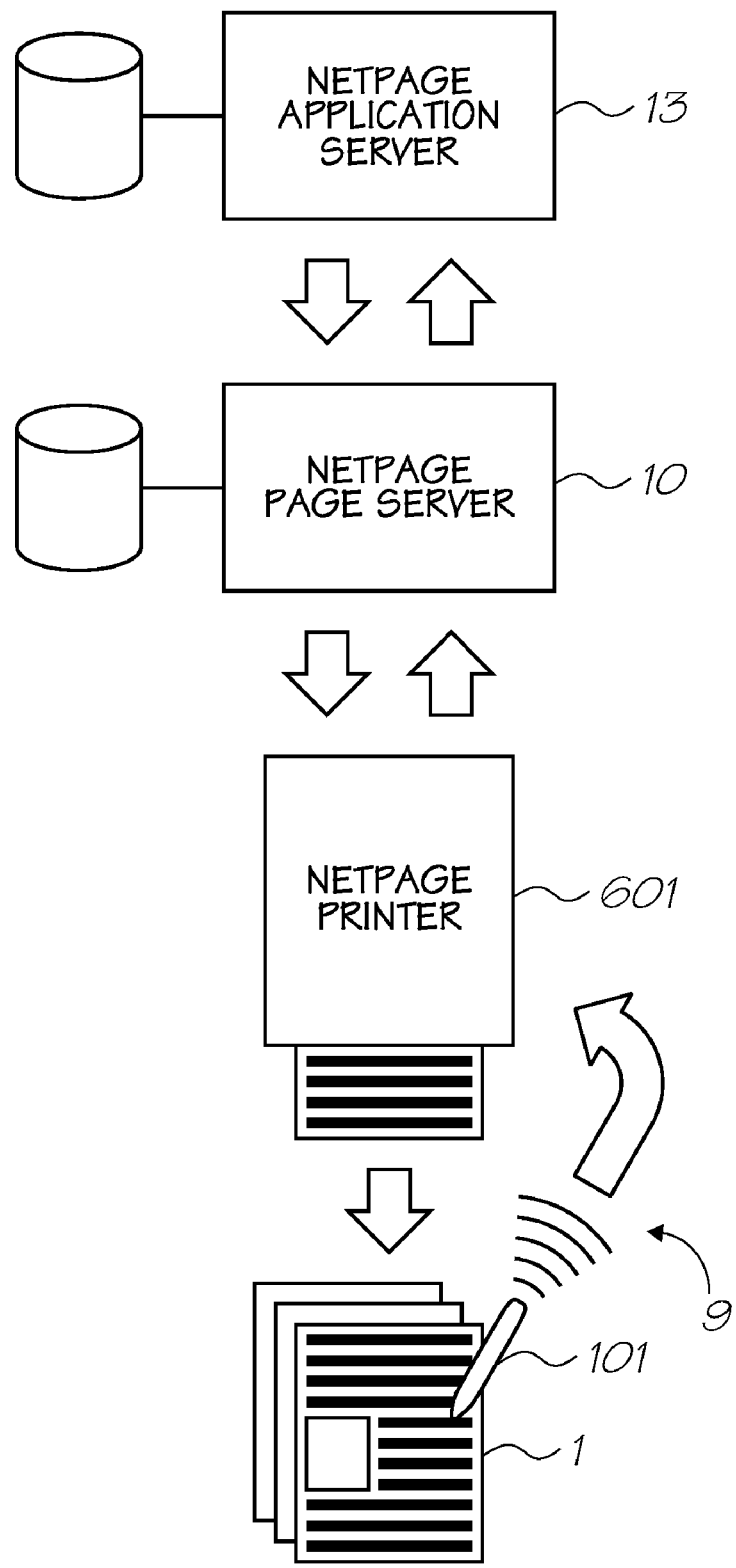
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Ser. No. 09/575,155 and our co-filed application U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
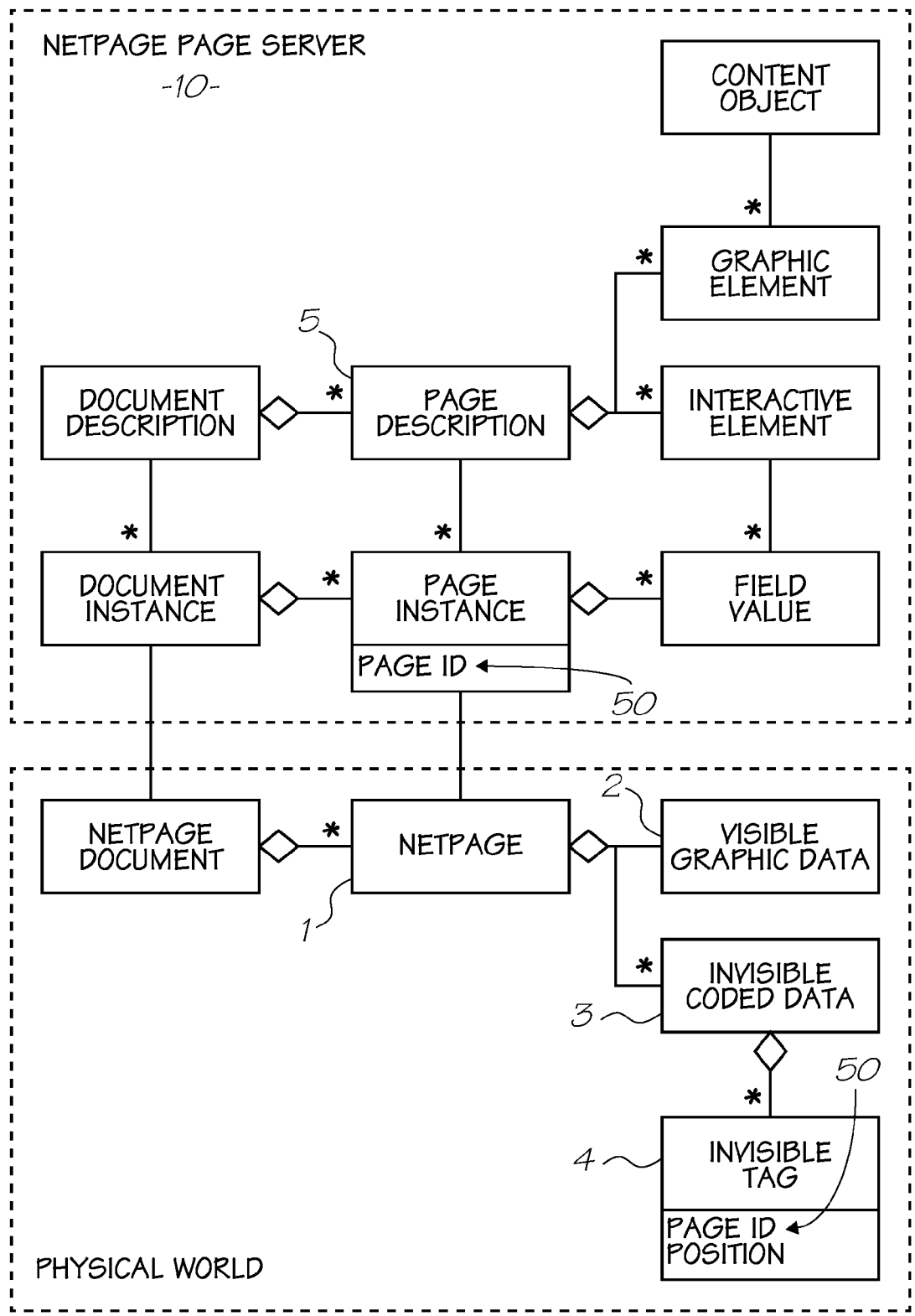
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary sub-region of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps.

The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
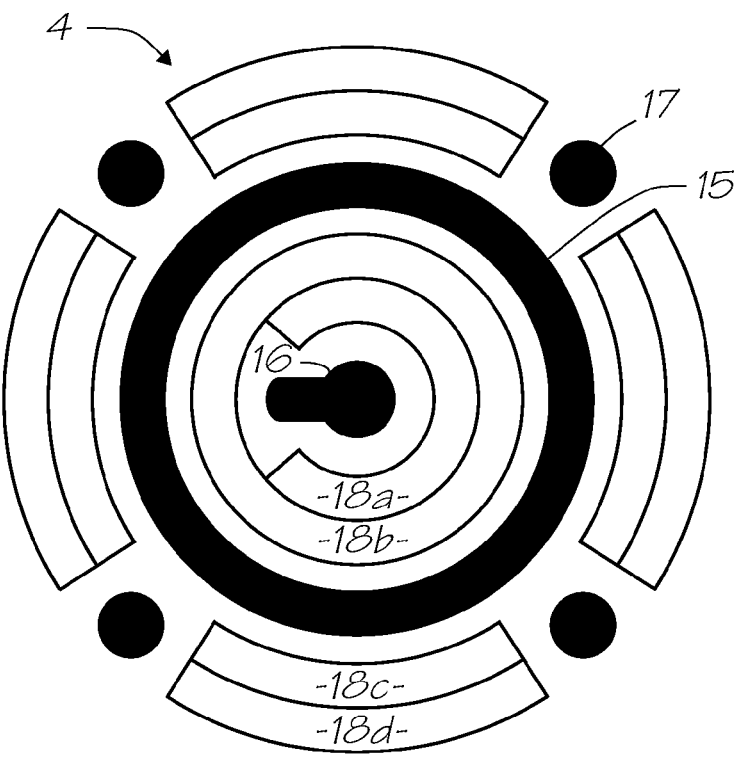
FIG. 4A is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
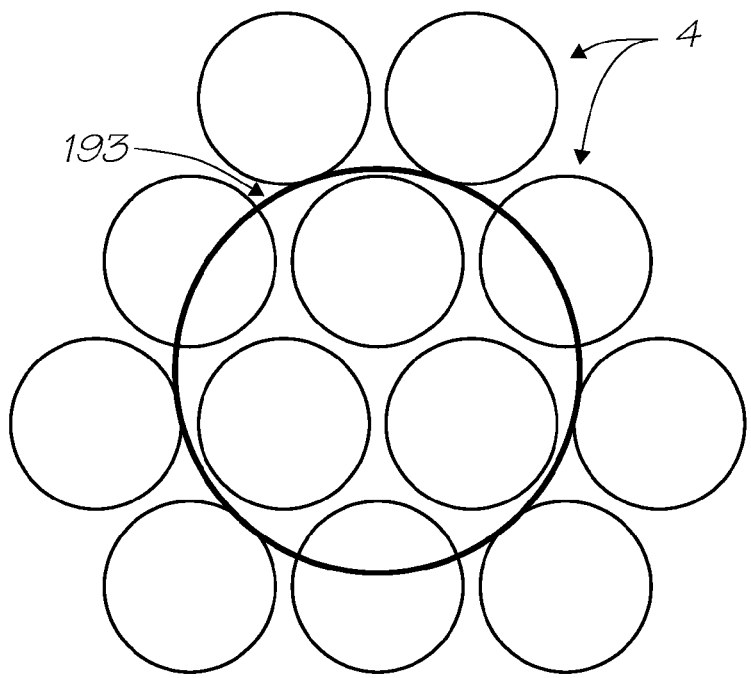
FIG. 4B is a plan view showing a relationship between a set of the tags shown in FIG. 4A and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
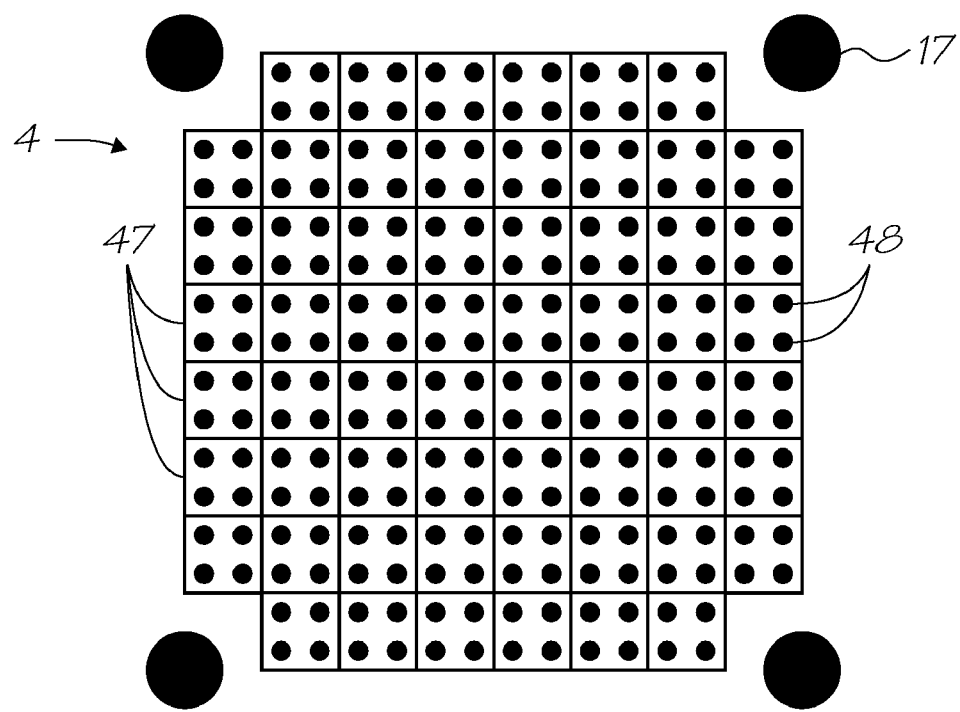
FIG. 5A is a plan view showing an alternative structure of a netpage tag.
Figure 5B:
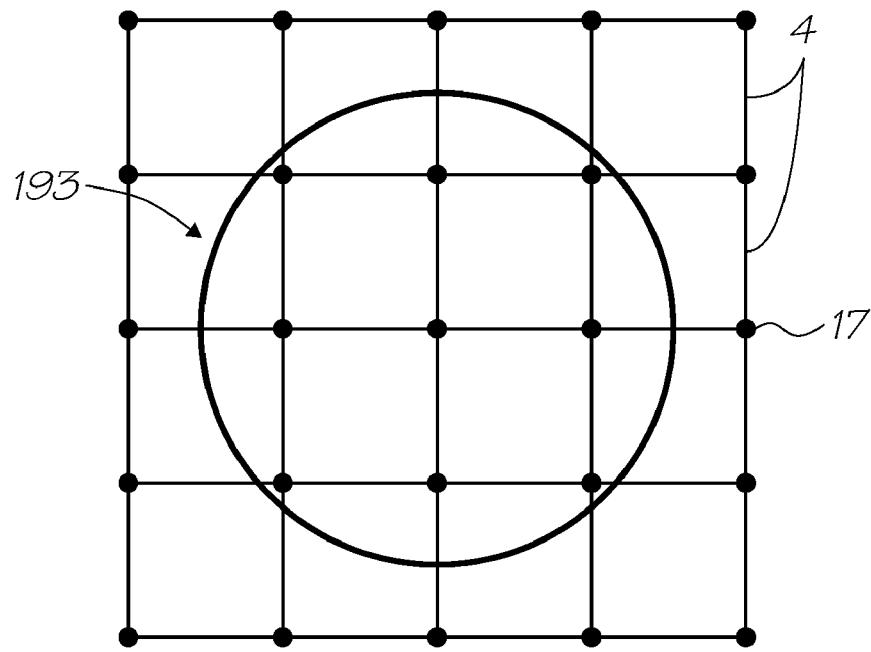
FIG. 5B is a plan view showing a relationship between a set of the tags shown in FIG. 5A and a field of view of a netpage sensing device in the form of a netpage pen.
Figures 5C, 5D:
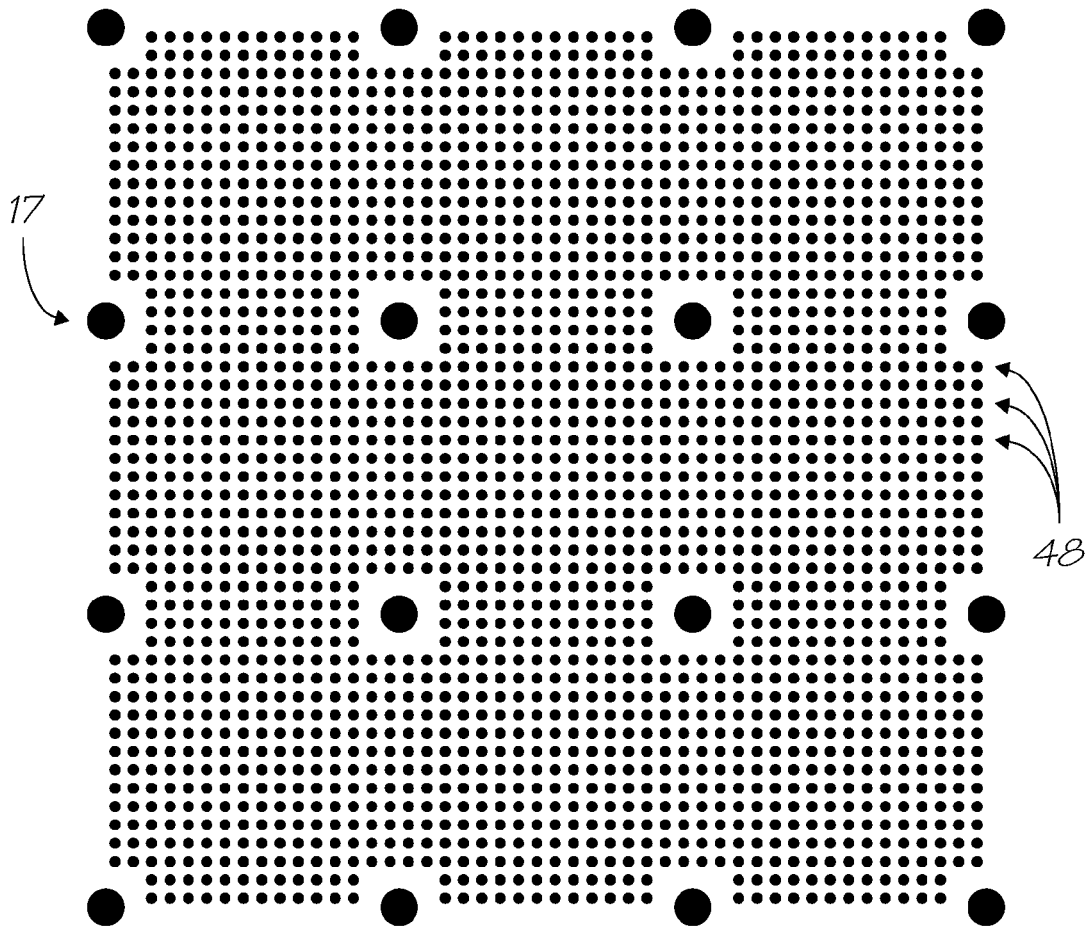
FIG. 5C is a plan view showing an arrangement of nine of the tags shown in FIG. 5A where targets are shared between adjacent tags.
FIG. 5D is a plan view showing the interleaving and rotation of the symbols of the four codewords of the tag shown in FIG. 5A.

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575, 174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
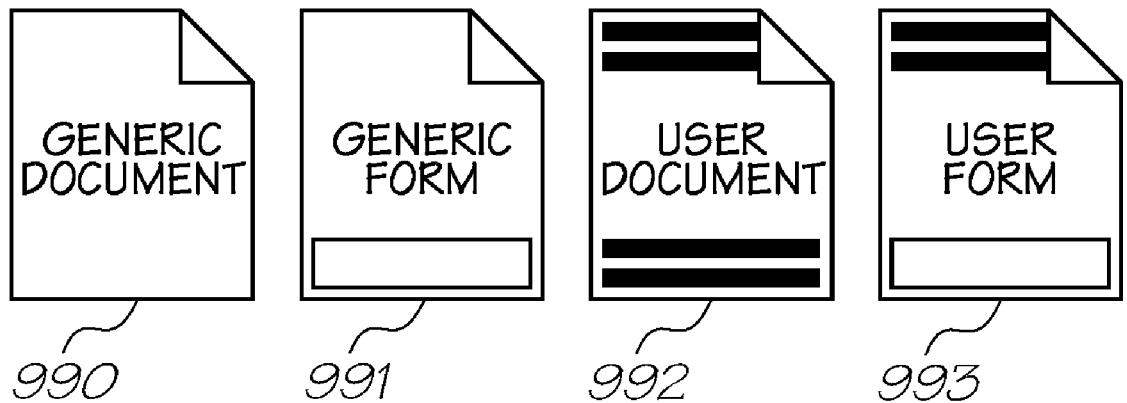
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Route Planning Via Interactive Paper

The netpage system provides a route planning application which allows a user to plan a route between two locations. The user can specify a point of origin and a destination by pressing on a netpage street map or by pressing the <Location> button on an advertisement or on someone's business card. The netpage route planning application can assume that the starting location is the location of the netpage printer through which the user is interacting, but allows the user to explicitly specify a different starting location, as well as to modify the default route and specify route constraints in the usual way supported by route-planning systems.

The same technique allows a location to be specified as the destination to any route planning system, for example an automobile navigation system's route planner. An automobile navigation system typically determines the location of the car via GPS, shows a local map to the driver on a color display, assists the driver in planning a route, and gives the driver verbal instructions on following a route, cued to the changing location of the car. The user can press on a location on a netpage street map and then press the <destination> button on the navigation system. The navigation system automatically programs the map location as the destination. The user also can press the <location> button on an advertisement or on someone's business card and then press the <destination> button on the navigation system. This yields a potentially more accurate location than one derived from a map. The present application is described in terms of an automobile navigation system, but applies equally to any portable navigation system.

Route Planning Object Model

The Route Planning object model revolves around maps and trip information.

Figure 8:
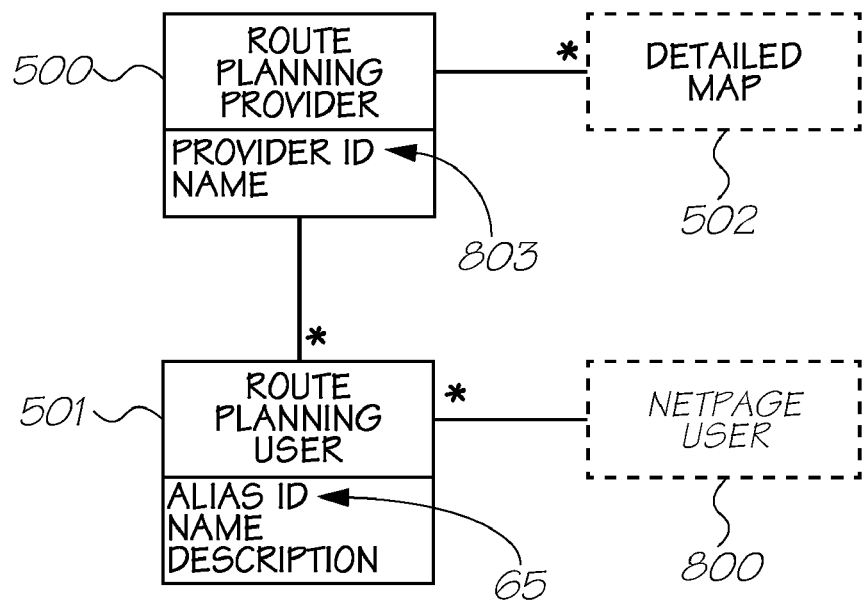
FIG. 8 illustrates the route planning user class diagram.

A route planning provider 500 has a unique identifier 803 and name. A route planning provider 500 has a number of route planning users 501. Each route planning user 501 has an alias identifier 65 unique within the scope of the route planning provider. Each route planning user 501 represents a particular netpage user 800 to the provider. A netpage user 800, on the other hand, can be a route planning user 501 of any number of providers 500. The Route Planning User class diagram is shown in FIG. 8.

The netpage registration server 11 maintains a "clipboard" for each netpage user 800 and for each netpage printer 601. A clipboard provides a standard mechanism for one application to share data with another application, without the two applications needing to have any knowledge of each other.

When a geographically-oriented netpage application determines that a user has selected a geographic location, it stores the selected location (or area) on the clipboard of both the user and the printer through which the user is interacting. This is then available for retrieval by other geographically-oriented applications, including the netpage route planning application. Further details of the clipboard are described in our co-filed application U.S. Ser. No. 09/693,705.

A location may be a netpage map point clicked on by the user. Alternatively it may be the location of a person or business obtained by clicking on the <Location> button on an advertisement or business card.

Figure 9:
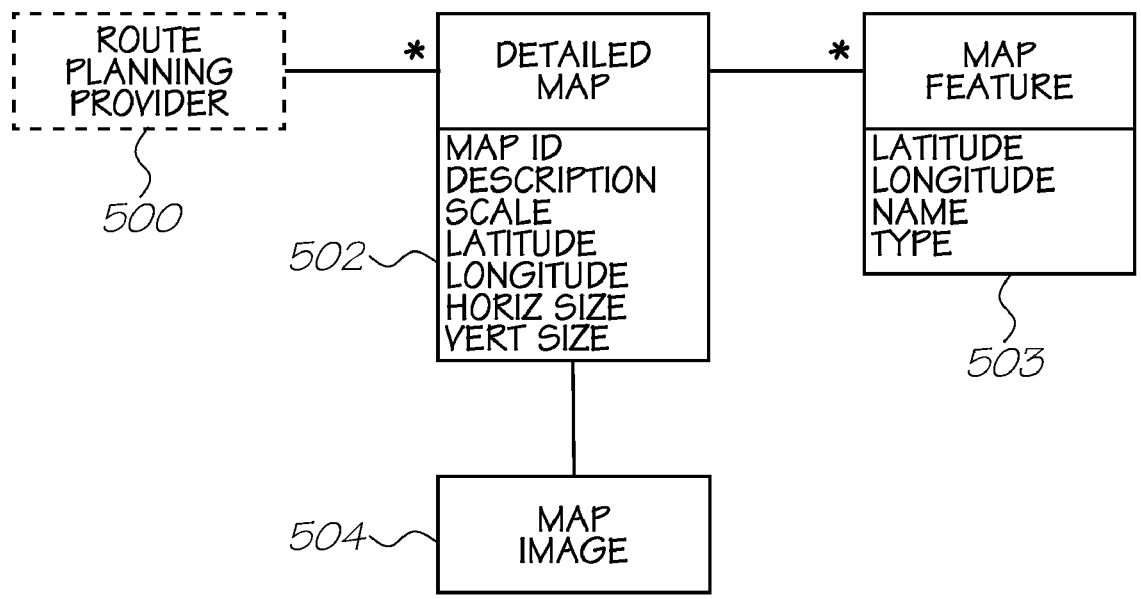
FIG. 9 illustrates the map class diagram.

A route planning provider 500 can have a number of detailed maps 502, each with a unique identifier, a description, a scale, the latitude and longitude of the top left corner of the map, a horizontal and vertical size, and a map image or other geographical map description. Each map has a number of map features 503. Each map feature 503 has a latitude and longitude, a name and a type. The Map class diagram is shown in FIG. 9.

Figure 10:
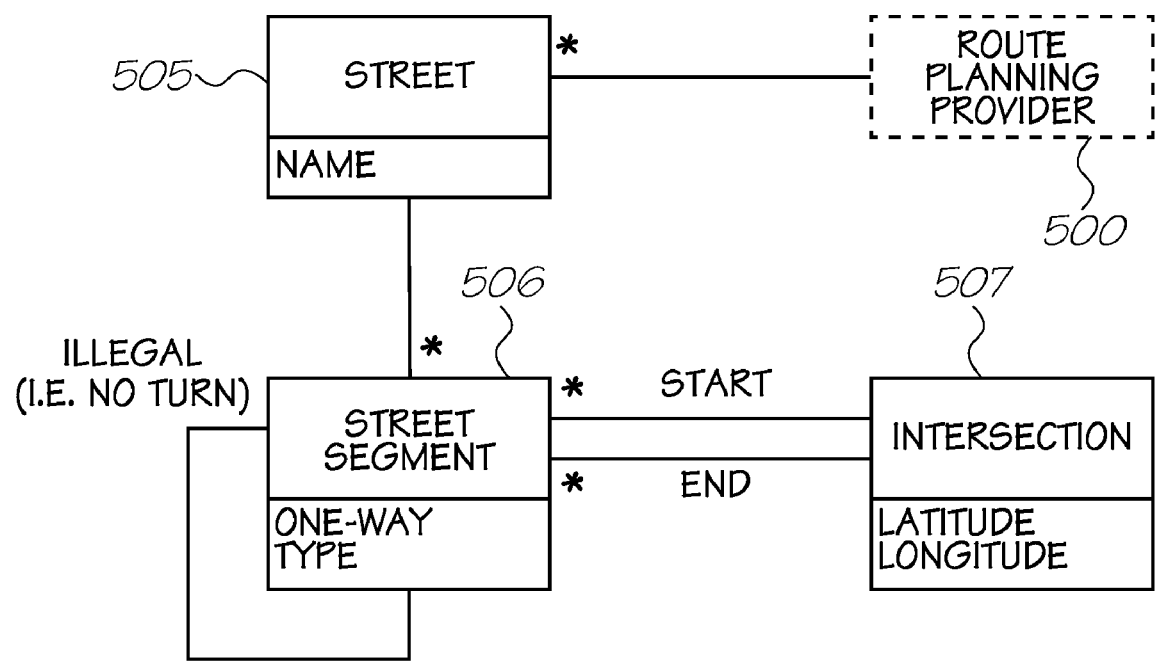
FIG. 10 illustrates the street class diagram.

A route planning provider 500 has a database of streets 505, each with a name. Each street 505 may comprise many street segments 506. A street segment 506 is part of a street running between two intersections 507. Each street segment 506 has a one-way flag, to indicate if the street segment is one-way or two-way, and a type. The street type may be a highway, tollway, suburban street, lane etc. There may be a relationship between two street segments indicating that turning from one street segment to another is not allowed. A street segment has a start intersection and an end intersection. Each intersection 507 has a location specified as a latitude and longitude. The Street class diagram is shown in FIG. 10.

Figure 11:
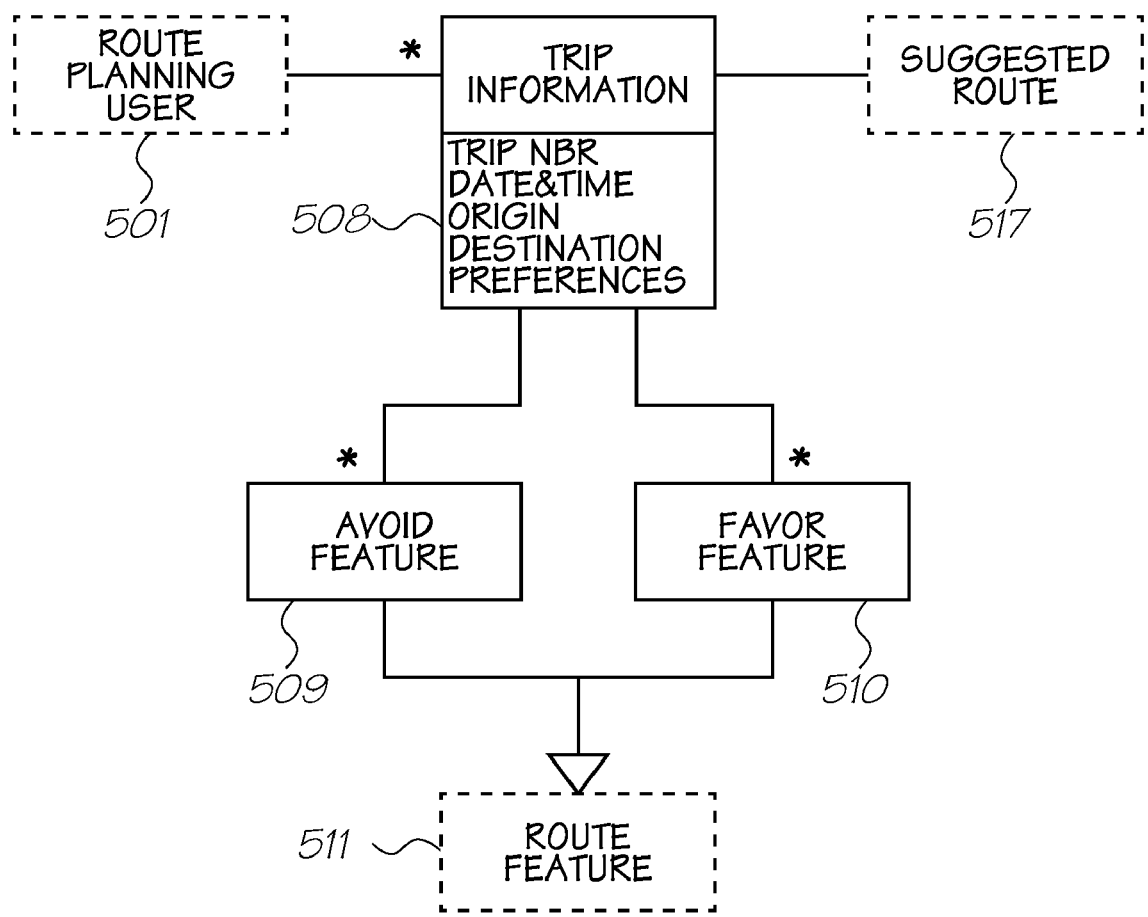
FIG. 11 illustrates the route planning class diagram.
Figure 12:
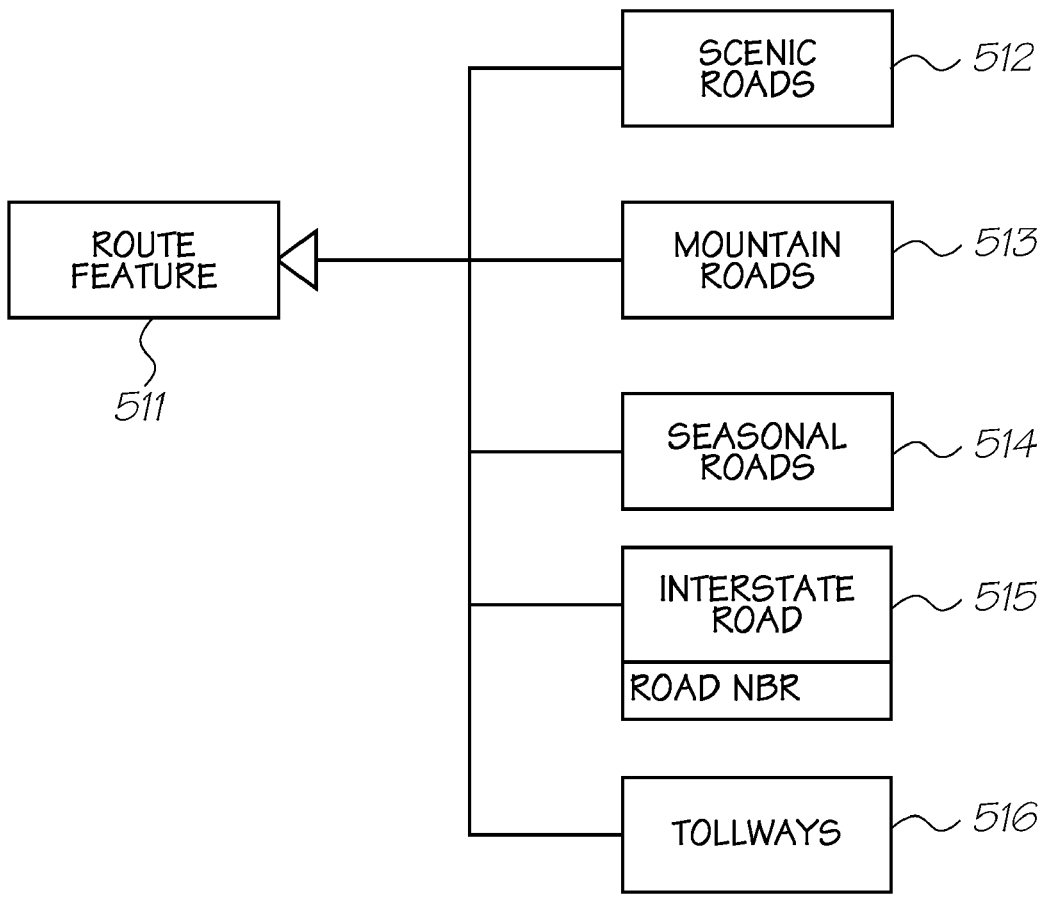
FIG. 12 illustrates the route feature class diagram.

A user 501 can plan a number of trips with a route planning provider. The trip information 508 comprises a trip number, the date and time the trip information was entered, the origin and destination of the trip, and trip preferences. The trip preferences comprise a number of "avoid" features 509 and a number of "favor" features 510, which are taken into account when planning the suggested trip route. The Route Planning class diagram is shown in FIG. 11. The route features 511 include scenic roads 512, mountain roads 513, seasonal roads 514, interstate roads 515 and tollways 516. The route planning provider can support other route features as well. The Route Feature class diagram is shown in FIG. 12.

Figure 13:
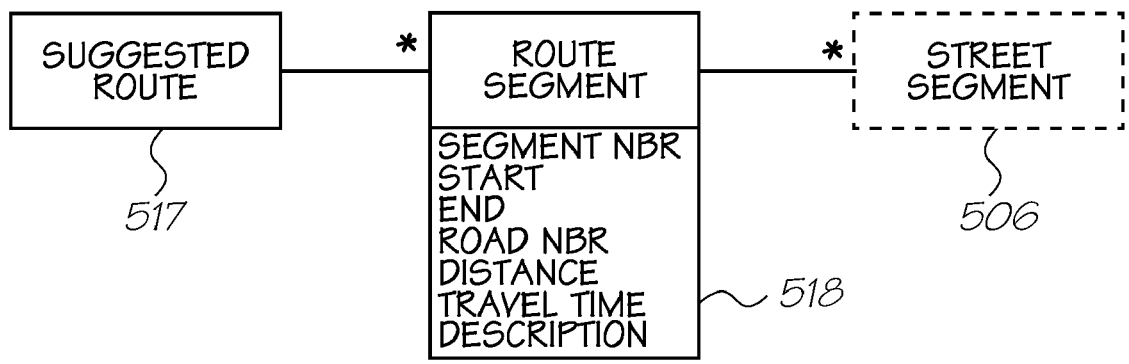
FIG. 13 illustrates the route plan class diagram.

Each set of trip information 508 has a suggested route 517 determined by the route planning application. The suggested route 517 is made up of a number of route segments 518. Each route segment 518 has a segment number, start point, end point, road number, distance (between the start and end points of the route segment), travel time, and a description. A route segment 518 is made up of one or more street segments 506. The Route Plan class diagram is shown in FIG. 13.

Route Planning User Interface

The user may obtain the Route Planner Origin page 520 from a variety of links including:

the netpage printer's help menu 46
the netpage user's own bookmark

Figure 14:
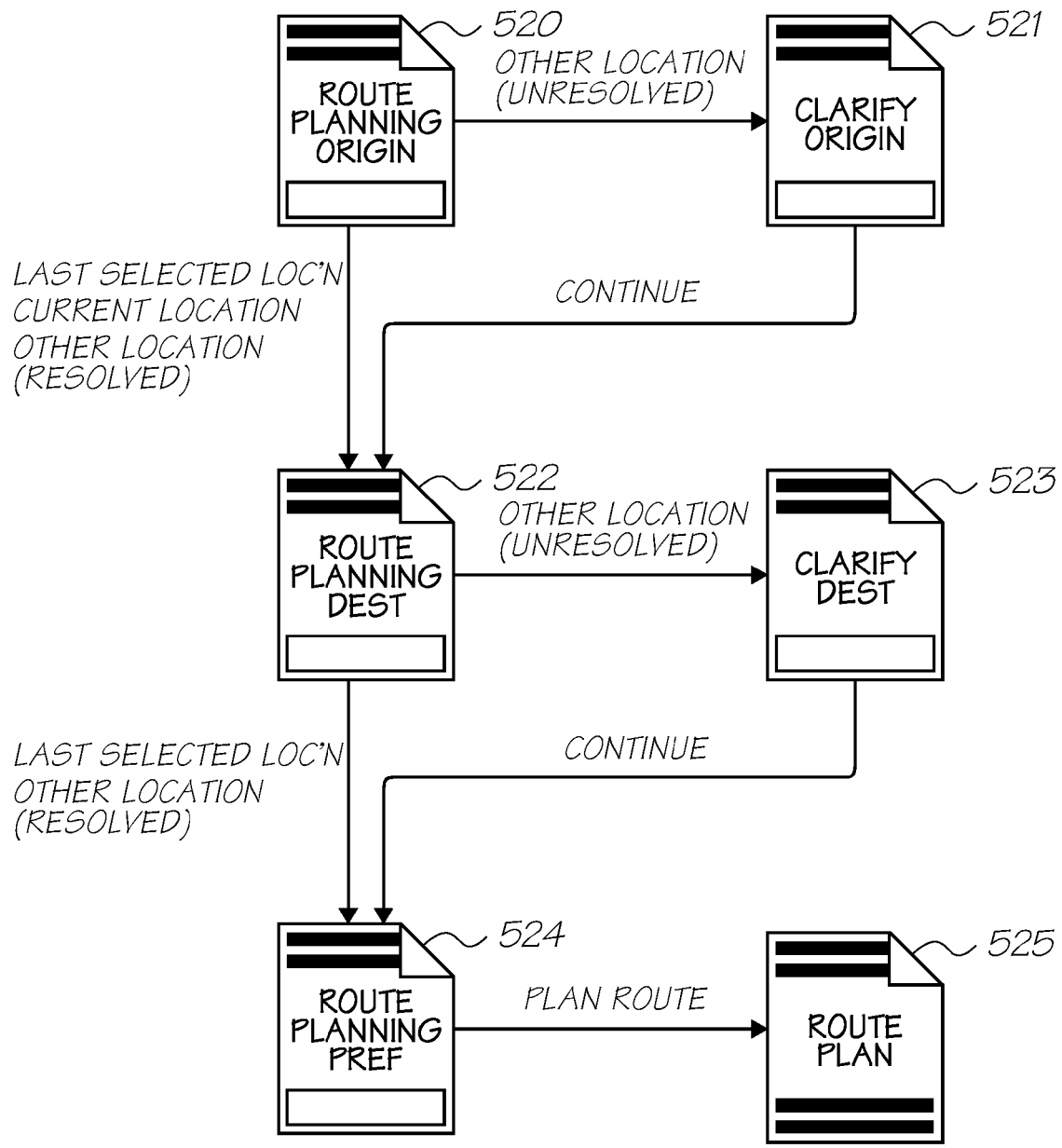
FIG. 14 illustrates the route planning user interface flow.

The Route Planning user interface flow is shown in FIG. 14.

Trip Origin

Figure 15:
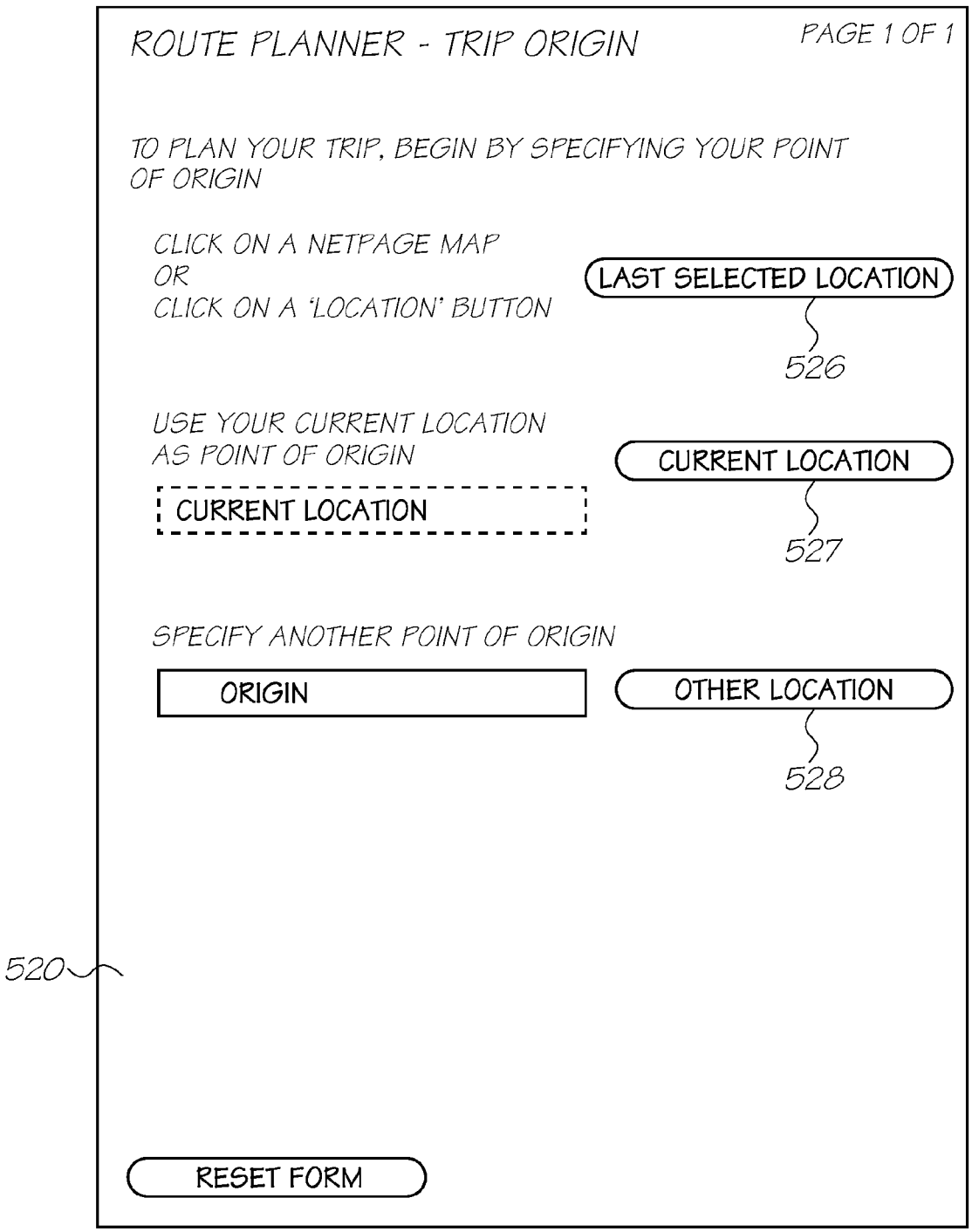
FIG. 15 illustrates the trip origin page.

The Trip Origin page 520 is shown in FIG. 15. The user can specify a point of origin for the trip in one of several ways. The user can click on a point on a netpage map and then click the <Last Selected Location> button 526 on the Trip Origin page 520. Printing maps and selecting geographic locations via printed netpage maps is described in more detail in our co-filed application U.S. Ser. No. 09/693,705. The user also can press the <Location> button on an advertisement or on someone's business card and then press the <Last Selected Location> button 526. This yields a potentially more accurate location than one derived from a map.

The last user-selected location is retrieved from the user's clipboard on the registration server, using the user's alias identifier 65.

If the user's point of origin is their current location, determined by the location of the printer through which the user is interacting, the user can click the <Current Location> button 527.

Alternatively the user can specify another point of origin by writing the place name or address in the <origin> field, and clicking the <Other Location> button 528. If the specified origin is ambiguous, such as a place name for which there are matches in several states, a Clarify Origin page 521 is printed, giving a list of more detailed place names for the user to select from.

The user can click <Reset Form> to print a blank Trip Origin page 520.

When the trip origin is chosen the Trip Destination page 522 is printed, as shown in FIG. 16.

Trip Destination

The user can specify a trip destination by clicking on a point on a netpage map and then clicking the <Last Selected Location> button on the Trip Destination page 522 (FIG. 16). The user also can press the <Location> button on an advertisement or on someone's business card and then press the <Last Selected Location>. This yields a potentially more accurate location than one derived from a map.

The last user-selected location is retrieved from the user's clipboard on the registration server 11, using the user's alias identifier 65.

Alternatively the user can specify another destination by writing the place name or address in the <destination> field, and clicking the <Other Location> button. If the specified destination is ambiguous, such as a place name for which there are matches in several states, a Clarify Destination page 523 is printed, giving a list of more detailed place names for the user to select from.

The user can click <Reset Form> to print a blank Trip Destination page 522.

When the trip destination is chosen the Preferences page 524 is printed, as shown in FIG. 17.

Trip Preferences

The user can specify trip preferences on the Preferences page 524 (FIG. 17). This page gives a list of route features including tollways, mountain roads, scenic roads, seasonal roads, and interstate roads. The user can specify a particular interstate road number. Optionally the route planning provider may include more route features.

The user can chose to favor or avoid each route feature by marking the appropriate checkbox. The user indicates no preference for a particular route feature by not marking either checkbox.

If no preferences are indicated, i.e. all the checkboxes are left blank, the quickest route is suggested.

Optionally the provider can allow the user to specify "detour data" (roads to exclude from the route plan) and other route constraints or preferences.

The user can click <Reset Form> to print a blank Preferences page 524.

Figure 18:
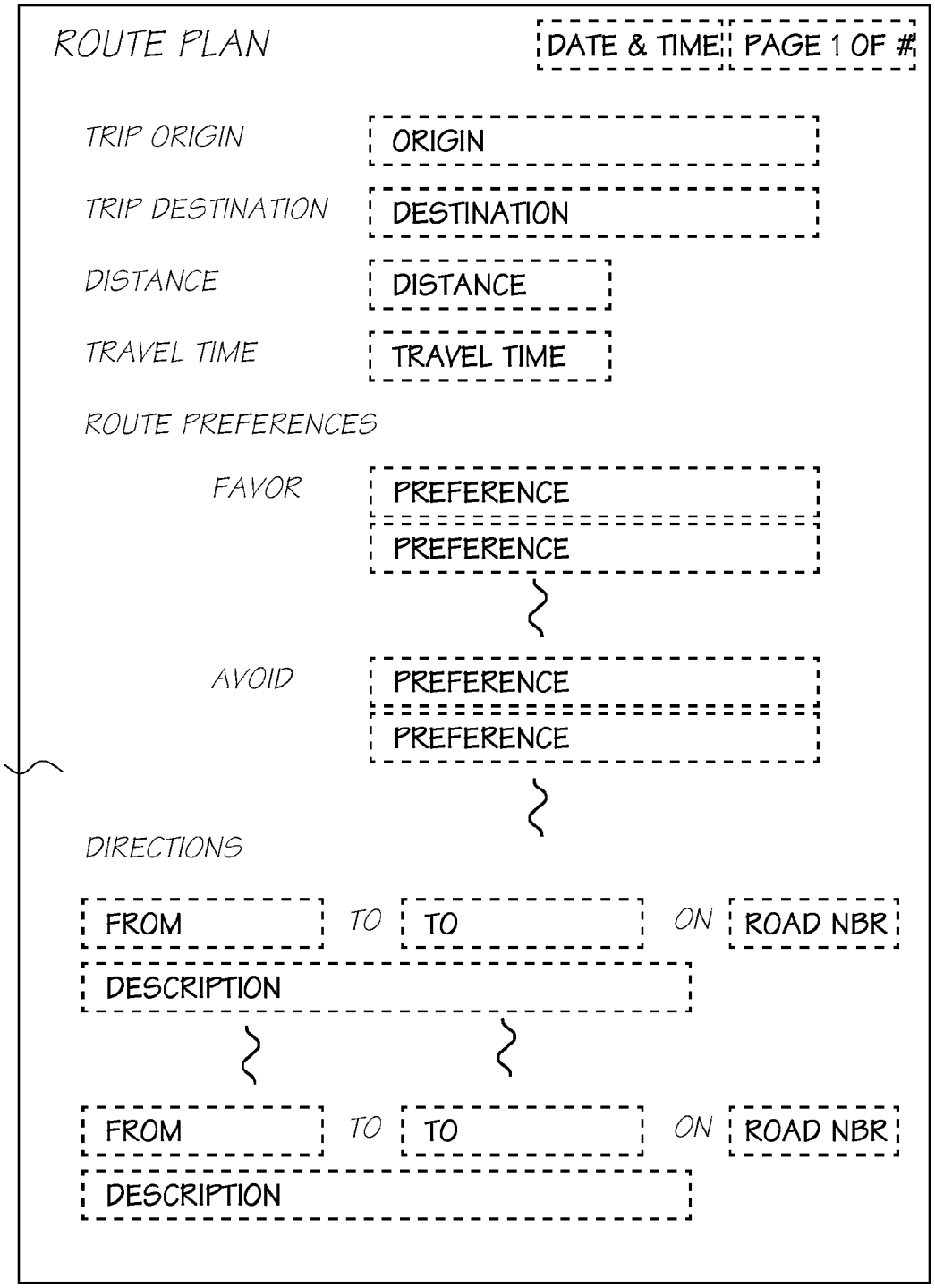
FIG. 18 illustrates the route plan page.

When the desired preferences are indicated the user clicks the <Plan Route> button 529. The Route Plan page 525 is printed, as shown in FIG. 18.

Route Plan

The Route Plan page 525 (FIG. 18) lists the trip information given by the user, and shows a suggested route plan for the trip. The page lists the trip origin, trip destination, trip distance (calculated from the route segment distances), the trip travel time (calculated from the route segment travel times), the route preferences, and the route plan (i.e. directions).

The route plan is the route segment information as determined by the route planning application. Optionally, the provider may include extra functionality or information with the route plan. For example the route plan may also include services, attractions etc. which may be encountered en-route.

Optionally the route plan can include advertising.

Automobile Navigation System Route Planner

A route planning system may be located within an automobile or personal navigation system. Alternatively the route planning system may be located on the netpage system, accessed via the netpage network.

The netpage system provides a convenient way for a driver to specify a location to a route planning system. The user can press on a location on a netpage street map, or press the <location> button on an advertisement or on someone's business card.

The user-selected location is stored as a map location list object on the user's clipboard and on the current printer's clipboard, on a netpage registration server. This can be accessed by the route planning system.

Navigation System with Netpage Network Connectivity

An automobile navigation system optionally contains a netpage printer, allowing the navigation system to obtain information from the netpage system via the netpage printer. In addition to providing connectivity to a netpage pen and to the netpage network, this allows the user to print more detailed maps, or other information regarding local businesses etc.

The driver specifies a destination to the automobile navigation system's route planner by pressing on a location on a netpage street map and then pressing the <destination> button on the navigation system. The navigation system automatically programs the map location as the destination. The user also can press the <location> button on an advertisement or on someone's business card and then press the <destination> button on the navigation system. This yields a potentially more accurate location than one derived from a map.

When the user presses on a location, the click is sent to the netpage printer, and then to the netpage page server in the usual way. The selected location is stored as a map location list object on the user's clipboard and on the printer's clipboard, on a netpage registration server.

When the user presses the <Destination> button on the navigation system the navigation system retrieves the location from the map location list object on the printer's clipboard, via the attached netpage printer. The navigation system doesn't know who the user is and therefore cannot look up the user's clipboard.

Figure 19:
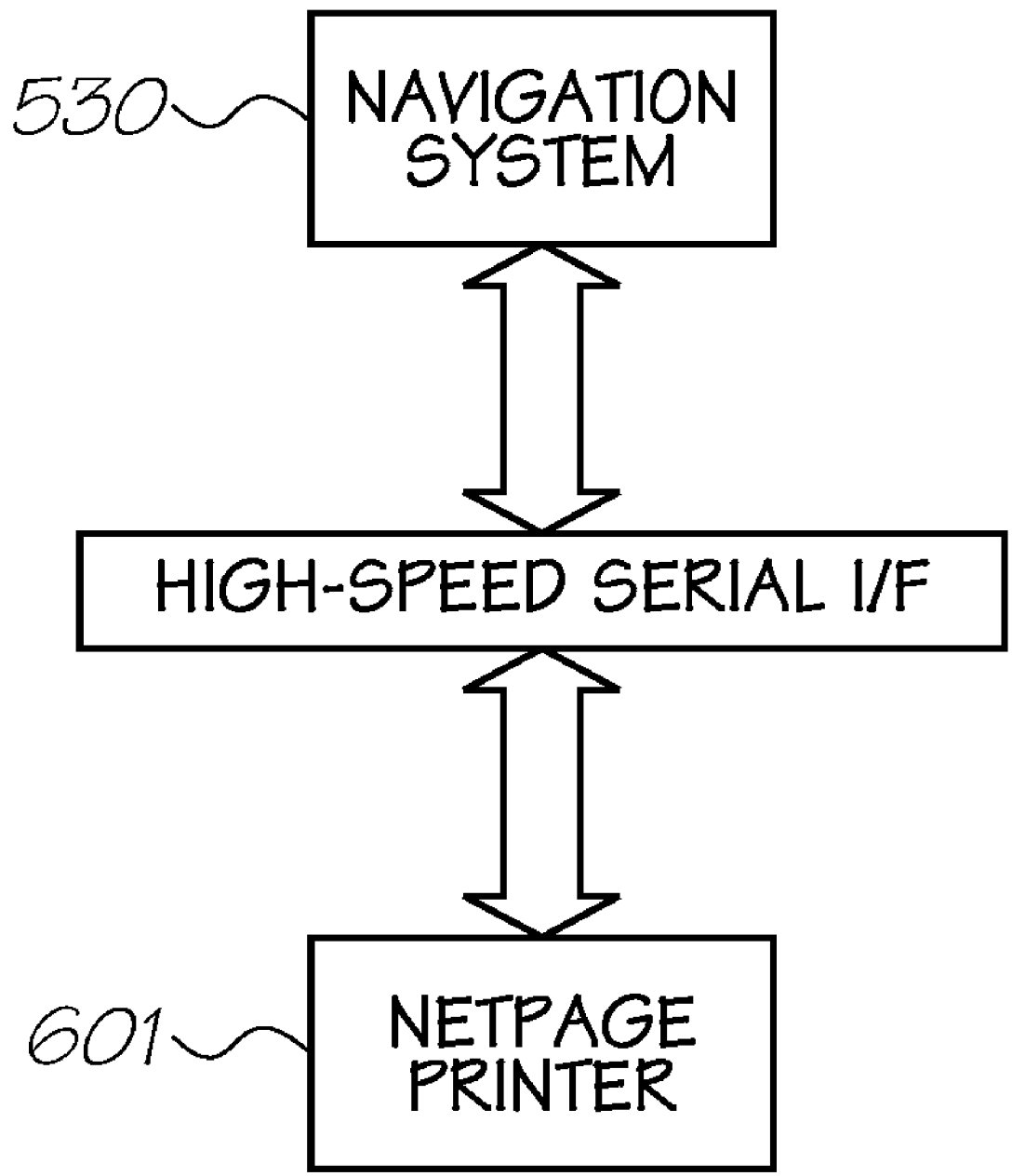
FIG. 19 illustrates the printer's high-speed serial interface between the navigation system and the netpage printer.

Communication between the navigation system 530 and the netpage printer 601 is via the printer's high-speed serial interface, as shown in FIG. 19.

Alternatively the navigation system 530 can contain a netpage pen interface (i.e. RF transceiver) and a netpage network interface 751 (but no netpage print engine). The navigation system itself then acts as a netpage device, mediating netpage pen interaction with the netpage system etc. and having its own "printer" ID. In this scenario the user cannot obtain printed netpage output.

Navigation System Without Netpage Network Connectivity

Another alternative configuration is for the automobile navigation system to contain a netpage pen interface, but no netpage network interface 751. The route planning system is embedded in the navigation system, and the location information is stored locally (or on some removable medium such as CD-ROM). The required location information relating to a map click can be retrieved from the route planning system database.

The latitude and longitude of a map position can be encoded directly in each netpage tag 4. There is sufficient precision in a netpage tag 4 to represent a global location to an accuracy of better than 1 meter. The tag can include information about the scale of the map so that the system can infer a more accurate location from the position of the pen relative to the tag. Each tag can also be indicative of a page position in the usual way, with the system translating a pen position to a map location via map information stored on the system.

Navigation System without a Route Planner

Some navigation systems do not provide automatic route generation, but instead allow the user to select and record a route. This route information is stored on the navigation system and used to provide directions to the user. In this case, a route plan can be generated by the forms-based netpage route planning system, and then the route information downloaded to the navigation system.

Alternatively, the user can program an explicit route manually by specifying the start and end point, and each intermediate point to the navigation system using the navigation system's user interface.

Route Planning Method

The route plan can be determined in a number of ways. There are a variety of algorithms available.

When the route planning application plans the route, it views the database of street segments and intersections as a graph, where each intersection is a vertex of the graph and each street segment is an edge. It assigns each edge a weight, representing the road distance. Weights can also be set to take into consideration the user's specified route preferences.

It computes the shortest path between two vertices in the graph using a single-source shortest-path algorithm.

The route planning application can alternatively use travelling time as the edge weight in order to find the fastest route between two points. In this case, highways have a smaller weight than suburban streets, for example.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for providing information, said system comprising:
- a printer for printing a printed page with visible and invisible data, said visible and invisible data being printed simultaneously, said invisible data being indicative of a position of the invisible data on the printed page and an identity of a page descriptor, the page descriptor describing a spatial extent of the visible data;
- a server for storing a plurality of page descriptors; and
- a sensing device for sensing the invisible data when placed in an operative position relative to the printed page, and transmitting information extracted from sensed invisible data to the server, wherein the server is configured to identify the page descriptor of the printed page, to interpret the positioning of the sensing device indicated by sensed invisible data, and to provide information associated with the page descriptor and positioning of the sensing device.

2. The system of claim 1, wherein the system provides navigational and related route planning information based on the interpreted positioning of the sensing device.

3. The system of claim 1, wherein the page descriptor consists of a graphic element and an interactive element having a field value uniquely identifying the printed page.

4. The system of claim 1, wherein the invisible data is printed on the page in infrared ink.

5. The system of claim 4, wherein the sensing device is pen-shaped and includes infra-red sensors to detect the invisible data.

6. The system of claim 1, wherein the invisible data is encoded on the printed page by means of a Reed-Solomon code.

7. The system of claim 6, wherein the invisible data is redundantly encoded.

* * * * *